United States Patent
Shimizu et al.

(10) Patent No.: US 6,310,168 B1
(45) Date of Patent: Oct. 30, 2001

(54) AMINATED POLYSILAZANE AND PROCESS FOR THE PREPARATION THEREOF

(75) Inventors: Yasuo Shimizu; Tomoko Aoki; Osamu Funayama, all of Saitama-ken (JP)

(73) Assignee: Tonen Corporation (JP)

( * ) Notice: Subject to any disclaimer, the term of this patent is extended or adjusted under 35 U.S.C. 154(b) by 0 days.

(21) Appl. No.: 09/485,174

(22) PCT Filed: Aug. 10, 1998

(86) PCT No.: PCT/JP98/03549

§ 371 Date: Feb. 7, 2000

§ 102(e) Date: Feb. 7, 2000

(87) PCT Pub. No.: WO99/07768

PCT Pub. Date: Feb. 18, 1999

(30) Foreign Application Priority Data

Aug. 8, 1997 (JP) .................................................... 9-227420

(51) Int. Cl.$^7$ ................................ C08G 77/62; C07F 7/10
(52) U.S. Cl. ................................ 528/28; 528/29; 528/31; 528/33; 528/38; 524/858; 524/869; 524/588; 556/412; 556/413; 525/474
(58) Field of Search ................................ 528/28, 29, 31, 528/33, 38; 524/858, 869, 588; 556/412, 413; 525/474

(56) References Cited

U.S. PATENT DOCUMENTS

| | | | | |
|---|---|---|---|---|
| 4,720,531 | * | 1/1988 | Chung et al. | 528/18 |
| 4,782,008 | * | 11/1988 | Babich et al. | 430/313 |
| 5,032,649 | * | 7/1991 | Schwark | 525/474 |

FOREIGN PATENT DOCUMENTS

06128529-A * 5/1994 (JP) .

OTHER PUBLICATIONS

R.C. West (Ed.): "Handbook of Chemistry and Physics" 1977—CRC Press Inc. XP002146700 (p. C–297).

* cited by examiner

*Primary Examiner*—Robert Dawson
*Assistant Examiner*—Jeffrey B. Robertson
(74) *Attorney, Agent, or Firm*—Lorusso & Loud

(57) ABSTRACT

An amine residue-containing polysilazane having a number average molecular weight of 100–100,000 and having a molecular chain containing a silazane structure represented by the general formula (I) shown below and/or a silazane structure represented by the general formula (II) shown below:

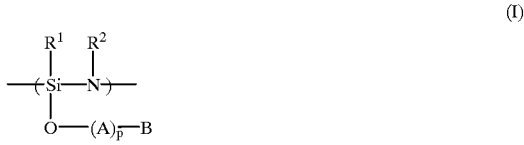

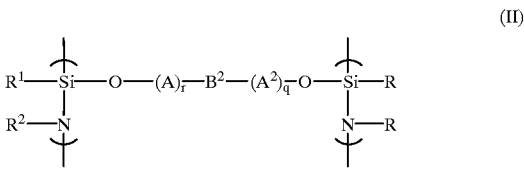

wherein $R^1$ and $R^2$ each stand for hydrogen, a hydrocarbyl group or a hydrocarbyl group-containing silyl group, A and $A^2$ each stand for a divalent hydrocarbyl group, B stands for an N-hydrocarbyl group-substituted amine residue or a cyclic amine residue, $B^2$ stands for a divalent linear amine residue or a divalent cyclic amine residue and p, r and q are each 0 or 1. The above polysilazane may be obtained by reacting a polysilazane with a mono- and/or dihydroxyl compound having an amine residue in an inert organic solvent containing no active hydrogen.

3 Claims, No Drawings

AMINATED POLYSILAZANE AND PROCESS FOR THE PREPARATION THEREOF

TECHNICAL FIELD

This invention relates to an amine residue-containing polysilazane and a method of preparing same.

BACKGROUND ART

A polysilazane, when heated, is converted into silica or a siliceous substance (hereinafter simply referred to as $SiO_2$ substances).

The $SiO_2$ substances thus formed have excellent insulating properties and are utilized in the electric and electronic fields as an insulating film.

Known polysilazanes, however, have a drawback because, without being modified, conversion rate thereof to $SiO_2$ substances is low and because a high calcination temperature is required for the conversion thereof into $SiO_2$ substances.

To solve the above problems, such a proposal has been made that a polysilazane is reacted with a reactive compound as a modifying agent to form a modified polysilazane.

JP-A-H6-128529 proposes a modified polysilazane obtained by reacting a polysilazane with an alkanolamine represented by the general formula: $NH_n(ROH)_{3-n}$ (where R is an alkyl group and n is an integer of 0–2).

In the case of this modified polysilazane, however, it is necessary that a polysilazane be reacted with an aminoalcohol in the form of a methanol or ethanol solution, because of strong hydrophilicity of the aminoalcohol. On the other hand, methanol and ethanol are highly reactive with polysilazanes and can easily decompose the polysilazanes. Therefore, an addition of a large amount of an alcohol to a polysilazane causes problems that the siliceous substance films obtained by calcination of the polysilazane films have a reduced density.

It is an objective problem of the present invention to provide a method of modifying a polysilazane with an amine residue-containing hydroxyl compound without using a lower alcohol such as methanol or ethanol and an amine residue-containing polysilazane obtained by such a method.

DISCLOSURE OF THE INVENTION

According to the present invention, there is provided an amine residue-containing polysilazane having a number average molecular weight of 100–100,000 and having a molecular chain containing a silazane structure represented by the general formula (I) shown below and/or a silazane structure represented by the general formula (II) shown below:

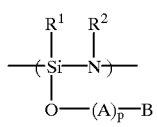
(I)

wherein $R^1$ and $R^2$ each stand for hydrogen, a hydrocarbyl group or a hydrocarbyl group-containing silyl group, A stands for a divalent hydrocarbyl group, B stands for an N-hydrocarbyl group-substituted amine residue or a cyclic amine residue and p is 0 or 1 with the proviso that p is 1 when B is an N-hydrocarbyl group-substituted amine residue and that p is 0 when B is a cyclic amine residue,

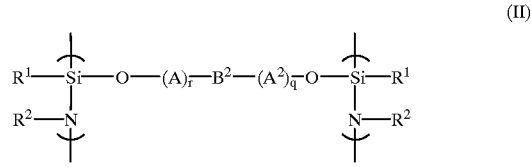
(II)

wherein $R^1$ and $R^2$ each stand for hydrogen, a hydrocarbyl group or a hydrocarbyl group-containing silyl group, A and $A^2$ each stand for a divalent hydrocarbyl group, $B^2$ stands for a divalent linear amine residue or a divalent cyclic amine residue and r and q are each 0 or 1 with the proviso that r and q are each 1 when $B^2$ is a divalent linear amine residue and that r and q are each 1 or 0 when B is a divalent cyclic amine residue.

The present invention also provides a process for the preparation of an amine residue-containing polysilazane having a number average molecular weight of 100–100,000 and having a molecular chain containing a silazane structure represented by the general formula (I) shown below:

(I)

wherein $R^1$ and $R^2$ each stand for hydrogen, a hydrocarbyl group or a hydrocarbyl group-containing silyl group, A stands for a divalent hydrocarbyl group, B stands for an N-hydrocarbyl group-substituted amine residue or a cyclic amine residue and p is 0 or 1 with the proviso that p is 1 when B is an N-hydrocarbyl groupsubstituted amine residue and that p is 0 when B is a cyclic amine residue, comprising reacting a polysilazane having a molecular chain containing a silazane structure represented by the general formula (III) shown below:

(III)

wherein $R^1$, $R^2$ and $R^3$ each stand for hydrogen, a hydrocarbyl group or a hydrocarbyl group-containing silyl group, with the proviso that at least one of $R^1$ and $R^3$ represents hydrogen, with an amine residue-containing monohydroxyl compound represented by the general formula (IV) shown below:

$HO-(A)_p-B$ (IV)

wherein A, B and p have the same meaning as above, in an inert organic solvent having no active hydrogen.

The present invention further provides a process for the preparation of an amine residue-containing polysilazane having a number average molecular weight of 100–100,000 and having a molecular chain containing a silazane structure represented by the general formula (II) shown below:

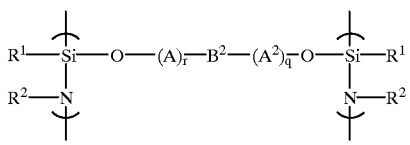

(II)

wherein $R^1$ and $R^2$ each stand for hydrogen, a hydrocarbyl group or a hydrocarbyl group-containing silyl group, A and $A^2$ each stand for a divalent hydrocarbyl group, $B^2$ stands for a divalent linear amine residue or a divalent cyclic amine residue and r and q are each 0 or 1 with the proviso that r and q are each 1 when $B^2$ is a divalent linear amine residue and that r and q are each 1 or 0 when $B^2$ is a divalent cyclic amine residue, comprising reacting a polysilazane having a molecular chain containing a silazane structure represented by the general formula (III) shown below:

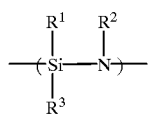

(III)

wherein $R^1$, $R^2$ and $R^3$ each stand for hydrogen, a hydrocarbyl group or a hydrocarbyl group-containing silyl group, with the proviso that at least one of $R^1$ and $R^3$ represents hydrogen, with an amine residue-containing dihydroxyl compound represented by the general formula (V) shown below:

(V)

wherein A, $A^2$ $B^2$, r and q have the same meaning as above, in an inert organic solvent having no active hydrogen.

The polysilazane used as a reaction raw material in the present invention is known per se and contains in its molecular chain a silazane structure represented by the above general formula (III). In the general formula (III), $R^1$, $R^2$, and $R^3$ each stand for hydrogen, a hydrocarbyl group or a hydrocarbyl group-containing silyl group, with the proviso that at least one of $R^1$ and $R^3$ represents hydrogen. The hydrocarbyl group includes an aliphatic hydrocarbyl group and an aromatic hydrocarbyl group. The aliphatic hydrocarbyl group in turn includes linear and cyclic hydrocarbyl groups. Examples of the hydrocarbyl groups include an alkyl group, an alkenyl group, a cycloalkyl group, a cycloalkenyl group, an aryl group and an arylalkyl group. The number of the carbon atoms of the hydrocarbyl group is not specifically limited but may be generally 20 or less, preferably 10 or less. Especially preferred is an alkyl group having 1–6 carbon atoms, more preferably 1–2. In the hydrocarbyl groupcontaining silyl group, the hydrocarbyl group preferably has 1–10 carbon atoms and, more preferably, is an alkyl group having 1–6 carbon atoms. The number of the hydrocarbyl groups bonded to Si is 1–3.

The polysilazane used for the purpose of the present invention may possess a linear, cyclic or crosslinked structure. A mixture of these polysilazanes may also be used. Further the polysilazane used for the purpose of the present invention may be a non-modified polysilazane or a polysilazane modified with a modifying agent such as an organic acid, an isocyanate, an amine, a palladium compound or a platinum compound. The number average molecular weight of the polysilazane is 100–100,000, preferably 300–5,000.

The modifying agent used in the present invention is an amine residue-containing hydroxyl compound of the above formula (IV) or (V).

In the amine residue-containing monohydroxyl compound of the above formula (IV), A stands for a divalent hydrocarbyl group, B stands for an N-hydrocarbyl group-substituted amine residue or a cyclic amine residue and p is 0 or 1 with the proviso that p is 1 or 0 when B is a cyclic amine residue.

The divalent hydrocarbyl group A includes a divalent aliphatic hydrocarbyl group and a divalent aromatic hydrocarbyl group. The divalent aliphatic hydrocarbyl group in turn includes linear and cyclic hydrocarbyl groups. Examples of the divalent hydrocarbyl groups include an alkylene group, an alkenylene group, a cycloalkylene group, a cycloalkenylene group, an arylene group and an arylalkylene group. The number of the carbon atoms of the divalent hydrocarbyl group is not specifically limited but may be generally 20 or less, preferably 10 or less. Especially preferred is an alkylene group having 2–10 carbon atoms, more preferably 2–8.

The N-hydrocarbyl group-substituted amine residue B includes monosubstituted amine residues and disubstituted amine residues. The N-substituted amine residues include linear amine residues or cyclic amine residues. In the linear substituted amine residues, the hydrocarbyl group includes an aliphatic hydrocarbyl group and an aromatic hydrocarbyl group. The aliphatic hydrocarbyl group in turn includes linear and cyclic hydrocarbyl groups. Examples of the hydrocarbyl groups include an alkyl group, an alkenyl group, a cycloalkyl group, a cycloalkenyl group, an aryl group and an arylalkyl group. The number of the carbon atoms of the hydrocarbyl group is not specifically limited but may be generally 20 or less, preferably 1–10, more preferably 1–3.

In the cyclic amine residues, the number of carbon atoms contained in the nitrogen-containing ring is 3–20, preferably 4–8, while the number of nitrogen atoms contained in the nitrogen-containing ring is 1–3. Illustrative of cyclic amines are pyrrolidine, imidazolidine, 3-N-methylimidazolidine, imidazoline, pyrazolidine, 2-N-methylpyrazolidine, piperidine, piperazine, 4-N-methylpiperazine, indoline and isoindoline. In the cyclic amine residues, the bond may be from a nitrogen atom (—N) or from a carbon atom (—C).

When B is an N-hydrocarbyl group substituted amine residue in the monohydroxyl compound represented by the above general formula (IV), the hydroxyl compound may be represented by the following formula:

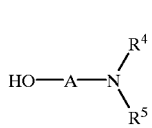

(VI)

In the formula (VI), A is as defined above and $R^4$ and $R^5$ each represent a hydrogen atom or a hydrocarbyl group which may be as described above.

The number of carbon atoms contained in the monohydroxyl compound represented by the formula (VI) is at least 3, preferably at least 4, more preferably at least 6. The upper limit of the carbon number is about 30. Illustrative of such monohydroxyl compounds are N-methyl(or N,N-dimethyl) propanolamine, N-methyl(or N,N-dimethyl)hexanolamine, N-methyl(or N,N-dimethyl)octanolamine, N-methyl(or N,N-dimethyl)dodecanolamine, N-methyl(or N,N-dimethyl)octadecanolamine, N-methyl(or N,N-dimethyl) oleyl alcoholamine, N-methyl(or N,N-dimethyl) cyclohexanolamine, N-methyl(or N,N-dimethyl)dibenzyl alcoholamine, N-methyl(or N,N-dimethyl)phenolamine, N-methyl(or N,N-dimethyl)naphtholamine, N-ethyl(or N,N-diethyl)ethanolamine, N-propyl(or N,N-dipropyl)ethanolamine, N-cyclohexylethanolamine and N-benzylethanolamine.

Illustrative of compounds in which N is a cyclic amine residue in the monohydroxyl compound of the above general formula (IV) are 2-imidazolidinylethanol, 4-imidazolinylethanol, 1-pyrazolidinylethanol, 2-pyrazolidinylethanol, 1-piperidinylethanol, 2-piperidinylethanol, N-methyl-2-piperidinylethanol, N-methyl-4-piperidinylethanol, 1-piperazinylethanol, 4N-methyl-1-piperazinylethanol, indolinylethanol, isoindolinylethanol, N-methylpyrrolidinol, N-methylpyrazolidinol, 2-piperidinol and N,N-dimethyl-2-piperazinol.

The divalent linear amine residue of the dihydroxyl compounds of the above general formula (V) may be represented by the formula —NR— (in which R is a hydrogen atom or a hydrocarbyl group). Divalent cyclic amine residues thereof may be various groups derived from various kinds of cyclic amines exemplified above. In this case, the two bonds of the cyclic amine residues may be from nitrogen atoms (—N and —N), from carbon atoms (—C and —C) or from nitrogen and carbon atoms (—N and —C).

The amine residue-containing polysilazane according to the present invention may be obtained by reacting a polysilazane with a monohydroxyl compound represented by the above general formula (IV) or a dihydroxyl compound represented by the above general formula (V) in a reaction solvent which is an inert organic solvent having no active hydrogen atoms.

Examples of the inert organic solvent include aromatic hydrocarbons such as benzene, toluene, xylene, ethylbenzene, diethylbenzene, trimethylbenzene and triethylbenzene; alicyclic hydrocarbons such as cyclohexane, cyclohexene, decahydronaphthalene, ethylcyclohexane, methylcyclohexane, p-menthane and dipentene (limonene); and saturated hydrocarbons such as n-pentane, i-pentane, n-hexane, i-hexane, n-heptane, i-heptane, n-octane, i-octane, n-nonane, i-nonane, n-decane and i-decane.

The above reaction is carried out at a temperature of 0–200° C., preferably 0–50° C. under 0–10 kg/cm$^2$G, preferably 0–2 kg/cm$^2$G. The concentration of a polysilazane in the reaction solvent is 0.1–50% by weight, preferably 1–10% by weight. The amount of the mono or dihydroxyl compound is 0.01–50% by weight, preferably 0.1–10% by eight, based on the polysilazane.

The hydroxyl compounds of the above general formulas (IV) and (V), which are hydrophobic, can be dissolved in the above hydrocarbon solvent and can be reacted smoothly and homogeneously with the polysilazane. Thus, the amine residue-containing polysilazane according to the present invention can give a high density calcined film when a film thereof is calcined, because, unlike a polysilazane obtained by the conventional method using a lower alcohol as a reaction solvent, no decomposition of the polysilazane by reaction with a lower alcohol occurs. The siliceous film obtained from the polysilazane film of the present invention has generally a density of 1.5–2.3 g/cm$^3$, preferably 1.8–2.3 g/cm$^3$.

The amine residue-containing polysilazane according to the present invention may be converted into a high purity siliceous film when formed into a film and calcined in air. The calcination temperature is 50–700° C., preferably 50–100° C. Thus a very low temperature may be adopted. Accordingly, the use of the polysilazane of the present invention permits the formation of dense siliceous thin films even on a low heat-resisting material such as plastic, wood or paper.

For the conversion of a polysilazane film into a high purity siliceous thin film, the presence of steam is required. High temperature steam of 200° C. or more is disadvantageous because semiconductors and liquid crystals are adversely affected thereby. Since a thin film formed of the polysilazane of the present invention is high in a rate of conversion into silica, an extremely lo steam vapor pressure can be adopted for converting the film into silica. In the case of the present invention, a high purity siliceous film may be efficiently obtained by pre-calcination in air (containing water vapor) at a low temperature of 200° C. or less, followed by calcination under a drying atmosphere at 200° C. or more.

Since the modified polysilazane according to the present invention has not experienced reactions resulting in a reduction of its molecular weight during the modifying stage, the content of low molecular weight polysilazane components is small. Further, since the speed of conversion thereof into silica is high, conversion of low molecular weight components into high molecular weight components proceeds rapidly when the polysilazane is formed into a film and calcined. No polysilazane vapors are generated during the calcination stage. Thus, the yield of the silica thin film is high. Additionally, since no polysilazane vapors are formed, various problems which would otherwise occur can be avoided.

The following examples will further illustrate in detail the present invention.

Reference Example 1

Preparation of Perhydropolysilazane

In a 2 L four-necked flask equipped with a gas feeding pipe, a mechanical stirrer and a Dewar condenser, 1500 ml of dry pyridine was placed after the inside of the reactor had been replaced with dry nitrogen and then cooled with ice. Dichlorosilane (100 g) was added to the flask to form an adduct ($SiH_2Cl_2.2C_5H_5N$) in the form of a white solid. The reaction product was cooled with ice and 70 g of ammonia was blown in the cooled reaction product. Subsequently, dry nitrogen was blown in a liquid layer of the reaction product for 30 minutes to remove excess ammonia therefrom. The thus obtained product was filtered under vacuum using a Buchner funnel in the atmosphere of dry nitrogen to obtain 1200 ml of a filtrate. Pyridine was distilled off with an evaporator to leave 40 g of perhydropolysilazane.

The number average molecular weight of thus obtained perhydropolysilazane was measured by GPC (developer: $CDCl_3$) and was found to be 800 in terms of polystyrene. It was confirmed that the IR (infrared absorption) spectrum showed absorptions attributed to N—H at waver numbers ($cm^{-1}$) of about 3340 and 1200; an absorption attributed to Si—H at 2170; and an absorption attributed to Si—N—Si at 1020–820.

EXAMPLE 1

Into a 300 ml glass beaker were introduced 20 g of perhydropolysilazane obtained in the above Reference Example 1 and 80 g of xylene to form a polysilazane solution. Next, 1.0 g of N-methylethanolamine was mixed with 20 g of xylene and the mixture was stirred well. This mixture was added slowly dropwise to the above polysilazane solution through about 5 minutes with vigorous stirring. The reaction was found to proceed mildly exothermally with generation of a gas.

The number average molecular weight of thus obtained polysilazane was measured by GPC and was found to be 1000 in terms of polystyrene. The IR (infrared absorption) spectrum showed an absorption at a wave number ($cm^{-1}$) of 2800–3100 attributed to N—H in addition to absorptions characteristic to polysilazane, namely absorptions at wave numbers ($cm^{-1}$) of about 3370 and 1180 attributed to N—H, absorptions at 2170 and 840 attributed to Si—H, and an absorption at 1060–800 attributed to Si—N—Si. The $^1$H-NMR spectrum (solvent: a mixture of xylene:$CDCl_3$=1:2 (by weight); concentration of perhydropolysilazane: 10% by weight) revealed the following peaks:

4.5–5.3 ppm (1H), assigned to Si—H1
4.3–4.5 ppm (1H), assigned to Si—H3
0.4–1.9 ppm (1H), assigned to N—H
2.5 ppm (1H), assigned to —N—$CH_3$
2.7–2.8 ppm (1H), assigned to $CH_3$—NH—$CH_2$—$CH_2$—
3.7–4.0 ppm (1H), assigned to $CH_3$—NH—$CH_2$—$CH_2$—
2.0–2.6 ppm (attributed to xylene used as solvent)

EXAMPLE 2

Into a 300 ml glass beaker were introduced 20 g of perhydropolysilazane obtained in the above Reference Example 1 and 80 g of xylene to form a polysilazane solution. Next, 1.0 g of N,N-dimethylethanolamine was mixed with 20 g of xylene and the mixture was stirred well. This mixture was added slowly dropwise to the above polysilazane solution through about 5 minutes with vigorous stirring. The reaction was found to proceed mildly exothermally with generation of a gas.

The number average molecular weight of thus obtained polysilazane was measured by GPC and was found to be 950 in terms of polystyrene. The IR (infrared absorption) spectrum showed an absorption at a wave number ($cm^{-1}$) of 2700–3100 attributed to C—H in addition to absorptions characteristic to polysilazane, namely absorptions at wave numbers ($cm^{-1}$) of about 3370 and 1180 attributed to N—H, absorptions at 2170 and 830 attributed to Si—H, and an absorption at 1060-800 attributed to Si—N—Si.

EXAMPLE 3

Into a 300 ml glass beaker were introduced 20 g of perhydropolysilazane obtained in the above Reference Example 1 and 80 g of xylene to form a polysilazane solution. Next, 1.0 g of N-methylpiperidinol was mixed with 20 g of xylene and the mixture was stirred well. This mixture was added slowly dropwise to the above polysilazane solution through about 5 minutes with vigorous stirring. The reaction was found to proceed mildly exothermally with generation of a gas.

The number average molecular weight of thus obtained polysilazane was measured by GPC and was found to be 950 in terms of polystyrene. The IR (infrared absorption) spectrum showed an absorption at a wave number ($cm^{-1}$) of 2700–3100 attributed to C—H in addition to absorptions characteristic to polysilazane, namely absorptions at wave numbers ($cm^{-1}$) of about 3370 and 1180 attributed to N—H, absorptions at 2170 and 830 attributed to Si—H, and an absorption at 1060–800 attributed to Si—N—Si.

EXAMPLE 5

Into a 300 ml glass beaker were introduced 20 g of perhydropolysilazane obtained in the above Reference Example 1 and 80 g of xylene to form a polysilazane solution. Next, 1.0 g of N-methylpyrrolidinol was mixed with 20 g of xylene and the mixture was stirred well. This mixture was added slowly dropwise to the above polysilazane solution through about 5 minutes with vigorous stirring. The reaction was found to proceed mildly exothermally with generation of a gas.

The number average molecular weight of thus obtained polysilazane was measured by GPC and was found to be 950 in terms of polystyrene. The IR (infrared absorption) spectrum showed an absorption at a wave number ($cm^{-1}$) of 2700–3100 attributed to C—H in addition to absorptions characteristic to polysilazane, namely absorptions at wave numbers ($cm^{-1}$) of about 3370 and 1180 attributed to N—H, absorptions at 2170 and 830 attributed to Si—H, and an absorption at 1060–800 attributed to Si—N—Si.

Application Example 1

Perhydropolysilazane obtained in Reference Example 1 and amine residue-containing polysilazanes obtained in Examples 1–5 were each converted into a siliceous film in the manner shown below. Each film was measured for its physical properties in the manner shown below. The results are summarized in Table 1.

Formation of Film and Conversion into Siliceous Film

Each of perhydropolysilazane and amine residue-containing polysilazanes was dissolved in xylene to form a 20% by weight solution. This was applied with a spin coater onto a silicon wafer having a diameter of 4 inches and a thickness of 0.5 mm (1000 rpm, 20 seconds). The coated film was converted into a silica film under each of the following three Silica Conversion Conditions (1)–(3):

(1) held for 10 minutes in a thermo-hygrostat at 90° C. and a relative humidity of 80%;
(2) maintained on a hot plate at 200° C. for 3 minutes in air (25° C., relative humidity: 40%) and then calcined at 40° C.
(3) allowed to stand in air (25° C., relative humidity: 40%) for 24 hours.

Silica Conversion Rate

Determined by IR spectrum.

A: substantially completely converted
B: almost completely converted
C: not completely converted Film Density A silicon wafer having a diameter of 4 inches and a thickness of 0.5 mm was weighed with an electronic force balance. The perhydropolysilazane solution or amine residue-containing polysilazane solution was applied with the above spin coater onto the silicon wafer and then converted into silica. The wafer having the film was again weighed with the electronic force balance. The weight of the film was a balance between the weighed values. The thickness of the film was measured with a profilometer (Dektak IIA manufactured by Solan Inc.). The film density is calculated by the following formula:

Film Density [$g/cm^3$]=(Film Weight [g]/Film Thickness [$\mu m$])/0.008

Etching Rate (Denseness)

Wafer having a siliceous film was immersed in an etching liquid which was a mixture of 100 ml of 60% by weight nitric acid and 1 ml of 50% by weight fluoric acid for 2 minutes. The thickness of the film before and after the immersion was measured with an ellipsometer, from which an etching rate per minute (Å/min) was calculated.

Smoke

Whether or not a smoke was generated when the sample was placed on the hot plate at 200° C. under the Silica Conversion Condition (2) above was observed with naked eyes.

| Example | 1 | 2 | 3 | 4 | 5 | Ref. Ex. 1 |
|---|---|---|---|---|---|---|
| Silica Conversion Condition (1) | | | | | | |
| Silica conversion rate | A | A | A | A | A | C |
| Film density (g/cc) | 2.2 | 2.1 | 2.1 | 2.2 | 2.2 | 1.4 |
| Etching rate (Å/min) | 1200 | 1300 | 1200 | 1200 | 1100 | >10000 |
| Silica Conversion Condition (2) | | | | | | |
| Silica conversion rate | A | A | A | A | A | C |
| Film density (g/cc) | 2.3 | 2.2 | 2.3 | 2.3 | 2.3 | 1.8 |
| Etching rate (Å/min) | 900 | 1100 | 1000 | 900 | 900 | 3000 |
| Silica Conversion Condition (3) | | | | | | |
| Silica conversion rate | B | B | B | B | B | C |
| Film density (g/cc) | 2.0 | 1.9 | 2.0 | 2.1 | 2.0 | 1.4 |
| Etching rate (Å/min) | 2800 | 3500 | 2600 | 2500 | 3000 | >10000 |

The amine residue-containing polysilazane according to the present invention does not require a highly reactive lower alcohol such as ethanol during its manufacture and, thus, is free of deterioration of the polysilazane caused by a reaction between the polysilazane and a lower alcohol. The siliceous film obtained by calcination of the polysilazane of the present invention has a high density and does not undergo evaporation of low molecular weight polysilazanes during the calcination.

The amine residue-containing polysilazane according to the present invention can be converted into a siliceous substance by calcination at 400° C. or less, especially a low temperature of 100° C. or less.

The amine residue-containing polysilazane according to the present invention may be used utilized for various applications similar to the conventional polysilazanes, preferably as a raw material for the formation of an interlayer insulation film for semiconductors. In addition the polysilazane according to the present invention is advantageously used as a raw material for the formation of an undercoat layer (insulation flattening film) for film liquid crystal glass or as an insulation film forming material in the electric or electronic filed such as a gas-barrier layer forming material for film liquid crystals.

The polysilazane of the present invention may be also used for hardening coating, heat-resisting and acid-resisting coating, anti-fouling coating or water-repellent coating of a solid surface such as of metals, glasses, plastics and woods. Furthermore, the polysilazane may be applied for gas-barrier coating of plastic films, for UV-cut coating or color coating of glass and plastic materials.

Incidentally, by reacting a polysilazane of the formula (III) with both an amine residue-containing monohydroxyl compound of the formula (IV) and a dihydroxyl compound of the formula (V), an amine residue-containing polysilazane having both a silazane structure of the formula (I) and a silazane structure of the formula (II).

What is claimed is:

1. An amine residue-containing polysilazane having a number average molecular weight of 100–100,000 and having a molecular chain containing a silazane structure represented by the general formula (I) shown below and/or a silazane structure represented by the general formula (II) shown below:

(I)

wherein $R^1$ and $R^2$ each stand for hydrogen, a hydrocarbyl group or a hydrocarbyl group-containing silyl group, A stands for a divalent hydrocarbyl group, B stands for an N-hydrocarbyl group-substituted amine residue or a cyclic amine residue and p is 0 or 1 with the proviso that p is 1 when B is an N-hydrocarbyl group-substituted amine residue and that p is 0 when B is a cyclic amine residue,

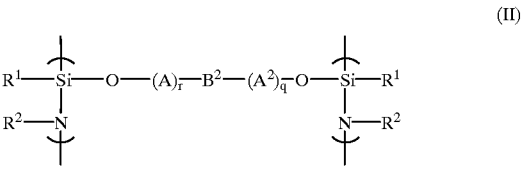

(II)

wherein $R^1$ and $R^2$ each stand for hydrogen, a hydrocarbyl group or a hydrocarbyl group-containing silyl group, A and $A^2$ each stand for a divalent hydrocarbyl group, $B^2$ stands for a divalent linear amine residue or a divalent cyclic amine residue and r and q are each 0 or 1 with the proviso that r and q are each 1 when $B^2$ is a divalent linear amine residue and that r and q are each 1 or 0 when $B^2$ is a divalent cyclic amine residue.

2. A process for the preparation of an amine residue-containing polysilazane having a number average molecular weight of 100–100,000 and having a molecular chain containing a silazane structure represented by the general formula (I) shown below:

(I)

wherein $R^1$ and $R^2$ each stand for hydrogen, a hydrocarbyl group or a hydrocarbyl group-containing silyl group, A stands for a divalent hydrocarbyl group, B stands for an N-hydrocarbyl group-substituted amine residue or a cyclic amine residue and p is 0 or 1 with the proviso that p is 1 when B is an N-hydrocarbyl group-substituted amine residue and that p is 0 when B is a cyclic amine residue, comprising reacting a polysilazane having a molecular chain containing a silazane structure represented by the general formula (III) shown below:

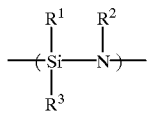 (III)

wherein $R^1$, $R^2$ and $R^3$ each stand for hydrogen, a hydrocarbyl group or a hydrocarbyl group-containing silyl group, with the proviso that at least one of $R^1$ and $R^3$ represents hydrogen, with an amine residue-containing monohydroxyl compound represented by the general formula (IV) shown below:

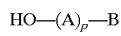 (IV)

wherein A, B and p have the same meaning as above, in an inert organic solvent having no active hydrogen.

3. A process for the preparation of an amine residue-containing polysilazane having a number average molecular weight of 100–100,000 and having a molecular chain containing a silazane structure represented by the general formula (II) shown below:

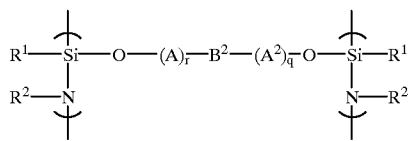 (II)

wherein $R^1$ and $R^2$ each stand for hydrogen, a hydrocarbyl group or a hydrocarbyl group-containing silyl group, A and $A^2$ each stand for a divalent hydrocarbyl group, $B^2$ stands for a divalent linear amine residue or a divalent cyclic amine residue and r and q are each 0 or 1 with the proviso that r and q are each 1 when $B^2$ is a divalent linear amine residue and that r and q are each 1 or 0 when B is a divalent cyclic amine residue, comprising reacting a polysilazane having a molecular chain containing a silazane structure represented by the general formula (III) shown below:

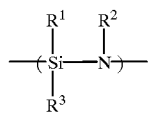 (III)

wherein $R^1$, $R^2$ and $R^3$ each stand for hydrogen, a hydrocarbyl group or a hydrocarbyl group-containing silyl group, with the proviso that at least one of $R^1$ and $R^3$ represents hydrogen, with an amine residue-containing dihydroxyl compound represented by the general formula (V) shown below:

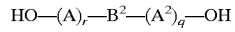 (V)

wherein A, $A^2$, $B^2$, r and q have the same meaning as above, in an inert organic solvent having no active hydrogen.

* * * * *